United States Patent
Laden et al.

(10) Patent No.: US 12,209,908 B2
(45) Date of Patent: Jan. 28, 2025

(54) METHOD FOR ACQUIRING AND FORMING A SPECTROMETRY IMAGE AND SPECTROSCOPIC MEASURING DEVICE

(71) Applicant: HORIBA FRANCE SAS, Palaiseau (FR)

(72) Inventors: Sébastien Laden, Bondues (FR); Alexandre Kokota, Lezennes (FR)

(73) Assignee: HORIBA FRANCE SAS, Palaiseau (FR)

( * ) Notice: Subject to any disclaimer, the term of this patent is extended or adjusted under 35 U.S.C. 154(b) by 290 days.

(21) Appl. No.: 17/802,340

(22) PCT Filed: Feb. 25, 2021

(86) PCT No.: PCT/EP2021/054681
§ 371 (c)(1),
(2) Date: Aug. 25, 2022

(87) PCT Pub. No.: WO2021/170717
PCT Pub. Date: Sep. 2, 2021

(65) Prior Publication Data
US 2023/0003581 A1 Jan. 5, 2023

(30) Foreign Application Priority Data
Feb. 26, 2020 (FR) .................. 2001912

(51) Int. Cl.
*G01J 3/44* (2006.01)
*G01J 3/28* (2006.01)
(52) U.S. Cl.
CPC ........... *G01J 3/4406* (2013.01); *G01J 3/2823* (2013.01)

(58) Field of Classification Search
CPC ............. G01J 3/2823; G01J 3/4406; G01J 2003/2813; G01J 2003/2826; G01J 3/0248; G01J 3/28; G01J 3/44; G01N 21/6458
See application file for complete search history.

(56) References Cited

U.S. PATENT DOCUMENTS

| 2010/0128263 | A1  | 5/2010  | Kobayashi |
|---|---|---|---|
| 2019/0086262 | A1* | 3/2019  | Richard ............... G01J 3/2803 |
| 2020/0386684 | A1  | 12/2020 | Nomura |

FOREIGN PATENT DOCUMENTS

| JP | 2010127726 A | 6/2010 |
|---|---|---|
| WO | 2018117273 A1 | 6/2018 |

OTHER PUBLICATIONS

International Search Report for PCT/EP2021/054681, dated May 25, 2021, 6 pages.

(Continued)

*Primary Examiner* — Courtney D Thomas
(74) *Attorney, Agent, or Firm* — NIXON & VANDERHYE

(57) ABSTRACT

Disclosed is a method of acquiring and forming a spectrometry image of a sample including the following steps: e1) acquisition of an initial image, composed of pixels, of an area of the sample and definition of a maximum set of N, $2 \leq N$, measurement positions of spectrometry, each measurement position including a coordinate and an intensity determined on the basis of the pixels; e2) assignment of a classification value to each of the N measurement positions on the basis of deviations, calculated based on an intensity difference and a coordinate difference, between the measurement positions; e3) determination of a group of P, $1 \leq P \leq N$, measurement positions as a function of the classification values; e4) successively, for each measurement position of the group, positioning of an excitation beam in (Continued)

the measurement position on the area of the sample, acquisition of a spectrometry measurement and formation of the spectrometry image.

20 Claims, 7 Drawing Sheets

(56) References Cited

OTHER PUBLICATIONS

Written Opinion of the ISA for PCT/EP2021/054681, dated May 25, 2021, 9 pages.
Takamori et al., "Optimization of Multimodal Spectral Imaging for Assessment of Resection Margins During Mohs Micrographic Surgery for Basal Cell Carcinoma", Biomedical Optics Express, United States, vol. 6, No. 1, Jan. 1, 2015, pp. 98-111.
Rowlands et al., "Rapid Acquisition of Raman Spectral Maps Through Minimal Sampling: Applications in Tissue Imaging", Journal of Biophotonics, DE, vol. 5, No. 3, Dec. 20, 2011, pp. 220-229.
Kong et al., "Diagnosis of Tumors During Tissue-Conserving Surgery With Integrated Autofluorescence and Raman Scattering Microscopy", Proceedings of the National Academy of Sciences, vol. 110, No. 38, ISSN: 0027-8424, XP055174821, Sep. 3, 2013, pp. 15189-15194.
Office Action, issued in Japanese Patent Application No. 2022-550125 dated Sep. 17, 2024.

* cited by examiner

METHOD FOR ACQUIRING AND FORMING A SPECTROMETRY IMAGE AND SPECTROSCOPIC MEASURING DEVICE

This application is the U.S. national phase of International Application No. PCT/EP2021/054681 filed Feb. 25, 2021 which designated the U.S. and claims priority to FR 2001912 filed Feb. 26, 2020, the entire contents of each of which are hereby incorporated by reference.

TECHNICAL FIELD TO WHICH THE INVENTION RELATES

The present invention generally relates to the field of methods of and instruments for acquiring a spectral or hyperspectral image of a sample, based on the use of point-by-point measurement techniques of Raman spectrometry, fluorescence, photoluminescence or cathodoluminescence and image reconstruction.

It relates more particularly to a method of acquisition and the formation of a spectral or hyperspectral image of a sample.

It relates in particular to a method of rapid acquisition and reconstruction of an image of a sample by Raman microspectroscopy, the high spatial resolution image being formed point by point.

It also relates to a spectroscopic measuring device designed to implement such a method.

TECHNOLOGICAL BACKGROUND

A specific spectrometric measurement is generally sufficient for the analysis of a spatially homogeneous sample. On the other hand, in the case of a spatially inhomogeneous sample, it is desirable to carry out spectrometry measurements in the form of an image constructed point by point with a spatial resolution adapted according to the structure or the microstructures of the sample.

Various spectrometric imaging techniques are known, based on the point-by-point acquisition of spectra and on the reconstruction of a spatially resolved spectrometric image. These systems require a displacement of the sample relative to the measuring instrument and an excitation beam focused at a point, or scanning of the excitation beam relative to the sample, or a combination of a scan of the beam and a displacement of the sample.

In a Raman micro-spectrometry imaging system based on sample displacement, the sample is placed on a motorized stage or equipped with piezoelectric actuators, to move the sample in two transverse directions (XY). The laser excitation beam is focused on the sample, on an area approximately 1 micrometer in diameter. The displacement of the sample generally follows a periodic grid having a constant pitch in X and in Y. A spectrum is acquired at each new position of the sample. Processing software reconstructs a hyperspectral image from this set of measurements.

Whatever the type of displacement chosen, the duration of acquisition of a point-by-point image is determined by the duration of acquisition of each point and by the number of points of the image. The acquisition time of each point is related to the luminosity and the spectral resolution of each point. The number of points in the image depends on the displacement step of the sample relative to the excitation beam or of this beam relative to the sample, which determines the spatial resolution of the image.

Acquiring a single Raman spectrum typically takes between 0.1 msec to 1 minute, and on average 1 second. To obtain an image of high spatial and spectral resolution, the acquisition time of a Raman micro-spectrometry image can reach several hours or even several tens of hours. These times are unsuitable for the analysis of many samples.

The main options for reducing spectrometry image acquisition time are reducing the acquisition time of each point and reducing the number of points in an image.

However, these options generally lead to a loss of quality of the reconstructed image, a reduction in the signal to noise ratio of each point and/or a reduction in the spatial resolution of the reconstructed image.

In some applications, it is desirable to reduce the acquisition time of a micro-spectrometry image or a hyperspectral image without loss of luminosity, signal-to-noise ratio, spectral resolution or spatial resolution on the image reconstructed point by point.

In other applications, it is desirable to increase the spatial resolution of a hyperspectral image or of a micro-spectrometry image without increasing the acquisition time of this image.

OBJECT OF THE INVENTION

In this context, the present invention proposes a method of acquiring and forming a spectrometric image of a sample comprising the following steps:
  e1) acquisition of an initial image of an area of the sample, the initial image being composed of pixels, and definition of a maximum set of N, $2 \leq N$, spectrometry measurement positions, each measurement position comprising at least one coordinate, representative of the measurement position with respect to the area of the sample, and at least one intensity, determined on the basis of at least one pixel of the initial image located in a neighborhood of the measurement position;
  e2) assignment of a classification value to each of the N measurement positions on the basis of deviations between the measurement positions, a deviation between two measurement positions being calculated on the basis of a difference in intensity and a difference in coordinates;
  e3) determination of a group of P, $1 \leq P \leq N$, measurement positions among the set of N measurement positions as a function of the classification values assigned in step e2); e4) successively, for each measurement position of the group determined in step e3), positioning of an excitation beam at said measurement position on the area of the sample, acquisition of a spectrometry measurement and construction of the spectrometry image based on the acquired spectrometry measurement(s).

Here, a measurement position represents a particular positioning of the excitation beam relative to the sample for the purpose of carrying out a spectrometry measurement.

Thus, thanks to the method of forming and acquiring a spectrometry image, classification values are assigned to the measurement positions. The classification value of a measurement position makes it possible to quantify the contribution of the measurement position for the formation of the spectrometry image. The contribution of a measurement position is an estimate of the weight, that is to say the importance, of the spectrometry measurement acquired at this measurement position, in the formation of the spectrometry image.

The contribution of a measurement position is determined based on the initial image. The contribution of a measurement position is determined with respect to the location of the measurement position on the sample. For example, measurement positions located in an area of the sample with strong intensity variations are considered to contribute more than measurement positions located in an area of the sample with constant intensity. In other words, an area of the sample of uniform intensity can be estimated precisely by a spectrometric measurement whereas an area exhibiting strong spatial variations in intensity must be estimated by several spectrometric measurements.

This method therefore makes it possible to organize or order the measurement positions, for example from the most contributing to the least contributing, by assigning them classification values.

Once the measurement positions have been organized, it is possible to acquire spectrometry measurements starting with the most contributing measurement positions. The spectrometry image can then be constructed progressively and updated with each new acquisition of a spectrometry measurement.

Consequently, during the acquisition and formation of the spectrometry image, the areas of the sample presenting strong spatial variations in intensity obtain in priority a higher spatial resolution (on the spectrometry image) than the areas of the sample of spatially constant intensity. The quality of the spectrometry image is therefore quickly satisfactory even after a few acquisitions Thus, acquiring spectrometry measurements in priority at the most contributing measurement positions makes it possible to obtain high quality for a given acceleration factor or for a given acquisition time. For example, for a given acceleration factor, the method makes it possible to obtain a spectrometry image having a better quality than with a distribution over a predetermined regular grid of the measurement positions to be acquired.

The acquisition of new spectrometry measurements can also be stopped when the quality of the image is deemed satisfactory by a user.

The acquisition of new spectrometry measurements can also be stopped once a determined acceleration factor is reached. The acceleration factor, which is sometimes called compression ratio, is defined as the ratio between the maximum number of measurement positions according to the spatial resolution of the spectrometry device and the number of spectrometry measurements acquired. A given acceleration factor is therefore inversely proportional to a given number of measurements acquired.

Other non-limiting and advantageous characteristics of the method according to the invention, taken individually or according to all technically possible combinations, are the following ones:
  the classification values attributed to step e2) are all different from each other;
  the deviation between two measurement positions is calculated on the basis of a weighted sum of the square of the intensity difference between the two measurement positions and the square of the coordinate difference between the two measurement positions;
  in step e3), the P measurement positions of the group are determined according to an ascending order, respectively descending order, of the classification values;
  in step e2), a list S comprising the measurement positions whose classification value remains to be assigned and a list U comprising the measurement positions whose classification value has been assigned are initialized, and the following steps e21) and e22) are iterated:
  e21) for each measurement position of the list S, determination of a total error by iterating the steps e211), e212) and e213) of:

e211) moving a considered measurement position from the list S to the list U;
e212) calculation of the total error associated with the considered measurement position on the basis of deviations between measurement positions from list S and measurement positions from list U;
e213) moving the considered measurement position from the list U to the list S;
e22) selecting a measurement position from the list S on the basis of each total error determined in step e21), assigning a value classification at the selected measurement position and moving the selected measurement position from list the S to the list U;
  a classification value is initialized to a predetermined value and at each iteration of step e22), a strictly lower, respectively strictly higher, classification value lower, respectively higher, than the lowest classification value, respectively the highest, is assigned to the measurement position having the lowest total error;
  in step e212), the determination of the total error associated with the measurement position considered comprises the following steps:
e2121) for each measurement position of the list U, determination of the measurement position of the list S with which the deviation is minimum, the value of the deviation between these two measurement positions defining a minimum deviation;
e2122) calculation of the total error on the basis of each minimum deviation determined in step e2121);
  the group comprises at least three measurement positions and a trajectory for carrying out the successive positionings of the excitation beam is predetermined;
  steps e3) and e4) are iterated and at each new iteration, the group determined in step e3) comprises only measurement positions for which a spectrometry measurement remains to be acquired;
  said method comprises a step e11) of acquisition of at least one spectrometry measurement in at least one predetermined measurement position, a predetermined classification value is assigned to each at least one predetermined measurement position;
  the construction of the spectrometry image comprises the following steps:
e41) for each measurement position for which a spectrometry measurement has been acquired, determination of a spectrometry value on the basis of said spectrometry measurement;
e42) for each remaining measurement position, determining a spectrometry value on the basis of at least one selected spectrometry measurement, which is selected as a function of the difference in coordinates between said remaining measurement position and the measurement position at which said at least one selected spectrometry measurement was acquired;
  in step e42), the selected spectrometry measurements are the spectrometry measurements acquired at measurement positions having a difference in coordinates with said remaining measurement position below a threshold value;
  in step e42), the spectrometry value is determined on the basis of each selected spectrometry measurement weighted by the deviation between the measurement position at which the selected spectrometry measurement was acquired and said remaining measurement position;

said method comprises a step e43) of interpolation of the spectrometry image in which a plurality of interpolation coefficients are determined on the basis of the deviations between the measurement positions;

said method comprises a stopping measure to end, in step e4), the acquisition of additional spectrometry measurements;

the number of spectrometry measurements to be acquired is predetermined;

a region of interest, comprising only part of the measurement positions, is predetermined in the initial image, and in step e3) the group is determined on the basis of the measurement positions belonging to the region of interest;

at least one spectrometry measurement is spatially integrated over a sector of the sample;

the initial image is acquired according to one of the following imaging methods:

spectroscopic acquisition at one or more predetermined spectral bands; optical acquisition in reflection or in transmission; hyperspectral acquisition; acquisition by atomic force microscope; acquisition by scanning electron microscope.

The invention also proposes a spectroscopic measuring apparatus comprising:

a light source designed to generate an excitation beam;

a support adapted to receive a sample;

an image capturing device;

a processor programmed to implement steps e1) to e4) of the method for acquiring and forming a spectrometry image.

DETAILED DESCRIPTION OF AN
EMBODIMENT

The following description with reference to the appended drawings, given by way of non-limiting examples, will make it clear what the invention consists of and how it can be implemented.

Of course, the different characteristics, variants and embodiments of the invention can be associated with each other in various combinations insofar as they are not incompatible or exclusive of each other.

DEVICE

Figure 1:
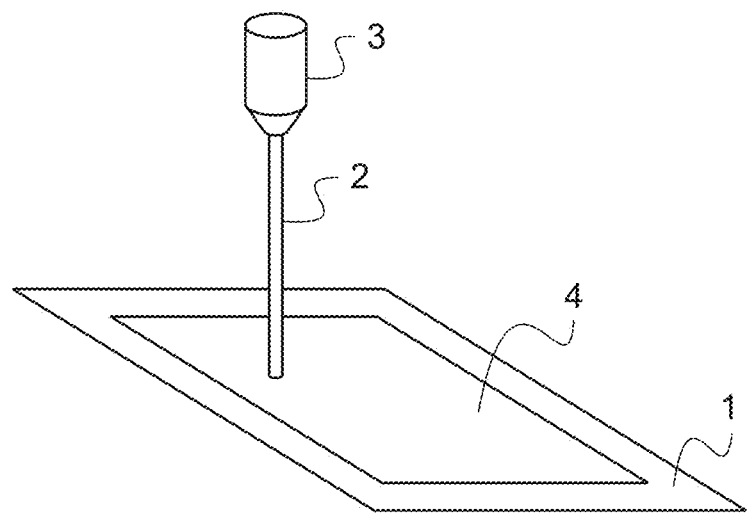
FIG. 1 is a schematic representation of a scanning beam imaging instrument.

In FIG. 1, there is shown schematically an example of an analysis instrument based on a beam scanning microscope intended to position an incident excitation beam 2 sequentially at different points of a sample 1. Such a microscope with scan includes a displacement stage system to displace sample 1 relative to the excitation beam 2 which remains fixed. This mode of relative movement of the excitation beam 2 with respect to the sample allows precise positioning of the excitation beam 2. Other microscopes include a scanning device (usually a scanner) to vary the angle of incidence of the excitation beam relative to the sample which remains fixed while the excitation beam is scanned. Finally, some microscopes combine scanning of the excitation beam and movement of the sample in order to cover an analysis surface having a greater spatial extent.

In general, a point-to-point spectrometry imaging microscope is configured to perform relative displacement of an excitation beam 2 with respect to the sample 1, so as to direct the excitation beam 2 sequentially to different sample 1 points to be analyzed. These different points of the sample 1 to be analyzed and where the excitation beam 2 can be placed, correspond here to the measurement positions, denoted PM. More precisely, the measurement positions form a maximum set of measurement positions. As detailed below, the method of the present disclosure makes it possible to select, among these N measurement positions, the most contributing measurement positions at which the spectrometry measurements are acquired as a priority and to determine the order in which these measurements are acquired. The method aims in fact at acquiring an effective number of spectrometry measurements lower than the maximum number N, to reduce the total duration of acquisition, while producing a spectrometry image of good quality, that is to say of high resolution in the most contributing areas of the sample.

The analysis instrument also comprises a spectrometry device, which makes it possible to acquire a spectrometry signal at each measurement position PM. The spectrometry signal at a point of sample 1 is called the spectrometry measurement.

The analysis instrument finally comprises a calculator and processing software for forming, thanks to the spectrometry measurements, a hyperspectral spectrometry image or even one or more images of the sample 1 in different spectral bands or at different wave lengths. Each point of the hyperspectral image therefore represents a spectrometry measurement, for example a Raman scattering spectrum, a fluorescence spectrum, a photoluminescence spectrum or a cathodoluminescence spectrum.

Figure 2:
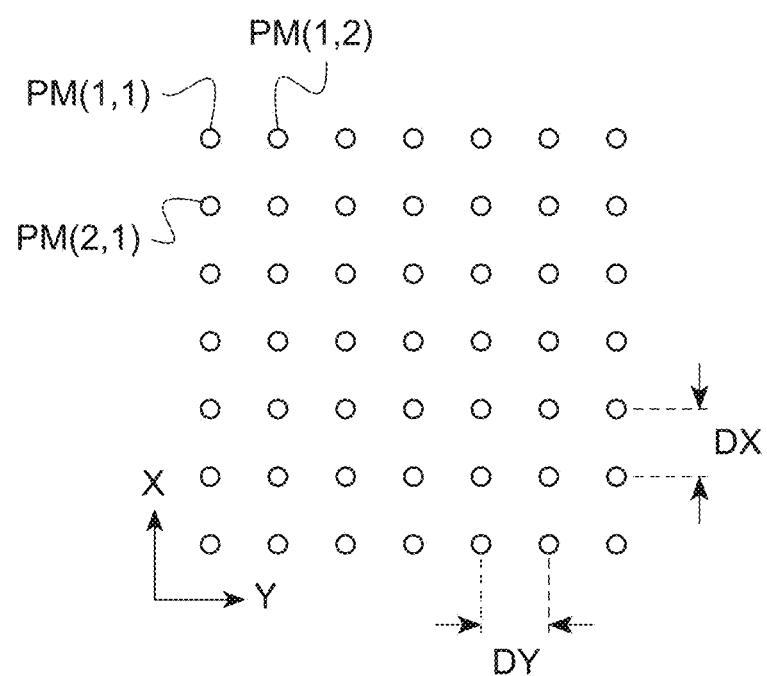
FIG. 2 is a schematic representation of a spatial distribution grid of measurement positions in an XY plane of the sample.

FIG. 2 illustrates a classic example of a grid of measurement positions PM at which the excitation beam 2 shall be positioned. The measurement positions PM are represented by measurement discs or spot 6 in a plane (XY) of an orthonormal reference frame on the surface of a sample. The grid is generally regular, rectangular or square, with a pitch DX along the X axis and a pitch DY along the Y axis. The pitch DX is generally chosen equal to the pitch DY.

A classic way of forming a spectrometry image is to place the incident beam 2 in a measurement position PM(1,1) and to acquire a first spectrometry measurement, then to move the excitation beam to a measurement position PM(1,2) to acquire a second spectrometry measurement. It is then possible to repeat the operations of relative displacement of the excitation beam 2 with respect to the sample 1 and of acquisition of a spectrometry measurement until a spectrometry measurement is obtained for each measurement position PM of the scanned surface 4 on sample 1.

The spatial resolution of the image thus obtained depends on the size of the excitation beam 2 on the sample 1 and on the chosen displacement pitch DX, DY.

The microscope can be an optical microscope comprising a microscope objective 3 to focus a laser beam 2 on a sample 1 to be analyzed. The optical microscope is combined with a Raman spectrometer or, respectively optical fluorescence or photoluminescence, configured to measure a Raman scattering spectrum or, respectively, an optical fluorescence or photoluminescence spectrum in the UV-visible range.

Alternatively, the microscope may be an X-ray fluorescence microscope, comprising an X-ray beam focusing and scanning system. The X-ray fluorescence microscope is then combined with a spectrometer configured to measure an X-ray spectrum (XRF).

Alternatively, the microscope may be a scanning electron microscope (SEM for Scanning Electron Microscope), comprising an electron beam focusing and scanning system. The scanning electron microscope is then combined with a spectrometer configured to measure an X-ray spectrum (EDX), or respectively a cathodoluminescence spectrum.

These analysis instruments make it possible to acquire point by point spectrometric measurements of a sample 1 on a scanned surface 4 with a spatial resolution determined in particular by the size of the incident excitation beam on the sample.

Point-to-point spectrometry imaging techniques provide a spatially and spectrally resolved image of a sample. For example, the application of Raman micro-spectrometry makes it possible to analyze the spatial distribution of a chemical composition in a zone of a pharmaceutical tablet, with a spatial resolution of the order of X, where X represents the wavelength of the excitation beam.

Conventionally, the spatial resolution of a spectral or hyperspectral image obtained by scanning microscopy is spatially uniform over the entire scanned and analyzed surface. The acquisition time of a scanning micro-spectrometry image increases as a function of the number of points in the spectrometry image thus formed. In practice, the acquisition time is approximately equal to the product of the number of spectrometry measurements by the acquisition time of a spectrometry measurement.

The analysis instrument of the invention may also advantageously comprise another imaging device making it possible to acquire an initial image, with high spatial resolution, of the area of the sample to be studied. This initial structural image can be a video image acquired by means of a CCD camera combined with the scanning microscope. In a SEM, a secondary electron detector can quickly provide an initial high spatial resolution image. However, certain structural details detected on a high-resolution video image, such as for example local variations in luminosity, can be indicative of variations in measurements obtained by spectrometry, although the video image cannot generally provide information of spectrometric type.

Method

Figure 3:
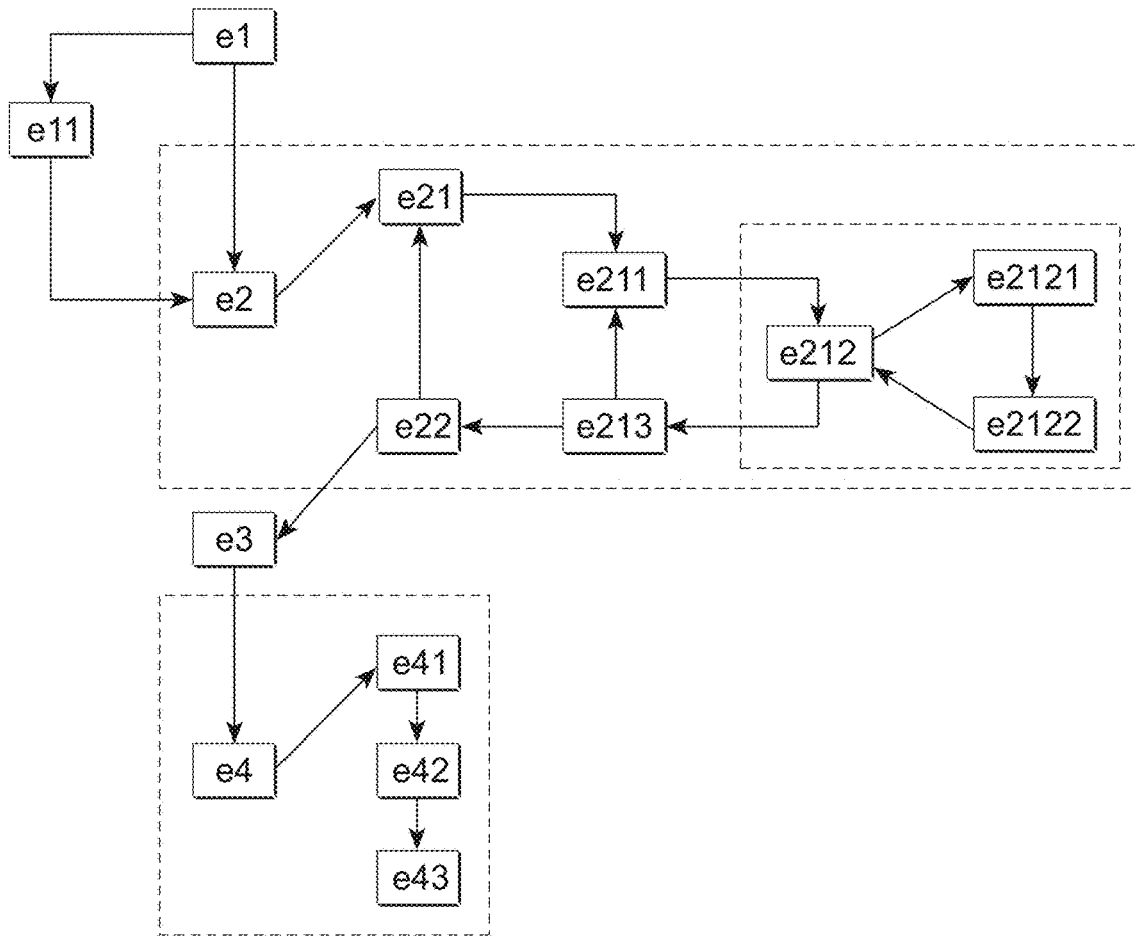
FIG. 3 is a block diagram of a sequence of steps for acquiring and forming a spectrometry image.

FIG. 3 shows a method of acquiring and forming a spectrometry image IS of Sample 1.

Step e1)

As shown in FIG. 3, the method comprises a step e1 of acquiring an initial image II of an area of sample 1, the initial image II being composed of pixels, and of defining a maximum set of N, $2 \leq N$, spectrometry measurement positions PM, each measurement position PM comprising at least one coordinate, representative of the measurement position PM with respect to the area of the sample, and at least one intensity, determined on the basis of at least one pixel of the initial image II located in a neighborhood of the measurement position PM.

By initial image II acquisition, it is meant here the detection of an image of sample 1 on an image sensor, for example of the CCD type or even the recovery of an image file of sample 1 obtained on another metrology instrument or from a database comprising an image of sample 1. Preferably, an initial digital image II is used. If the initial image II detected or collected is analog, it is digitized, so as to obtain a digital initial image II of the sample 1. If necessary, the initial image II is resized according to the area that shall be analyzed by scanning excitation beam 2 and/or by moving sample 1 relative to excitation beam 2.

In practice, the initial image II can be acquired according to one of the following imaging methods:
- spectroscopic acquisition at one or more predetermined spectral bands;
- optical acquisition in reflection or in transmission;
- hyperspectral acquisition;
- acquisition with an atomic force microscope;
- acquisition with a scanning electron microscope.

The initial image II can be acquired using the spectrometry device of the analysis instrument itself, for example in the case where the initial image II is a spectroscopic image with a single spectral band. Other modalities require an additional imaging device.

For example, here, the initial image II is a video image obtained by means of a CCD sensor and by illuminating the sample with white light. Lighting and detection system settings are adjusted to increase image contrast and bring out structural details. Advantageously, the intensity, the polarization and/or the illumination and/or detection wavelength are adjusted so as to obtain a highly contrasted initial structural image.

Figure 4:
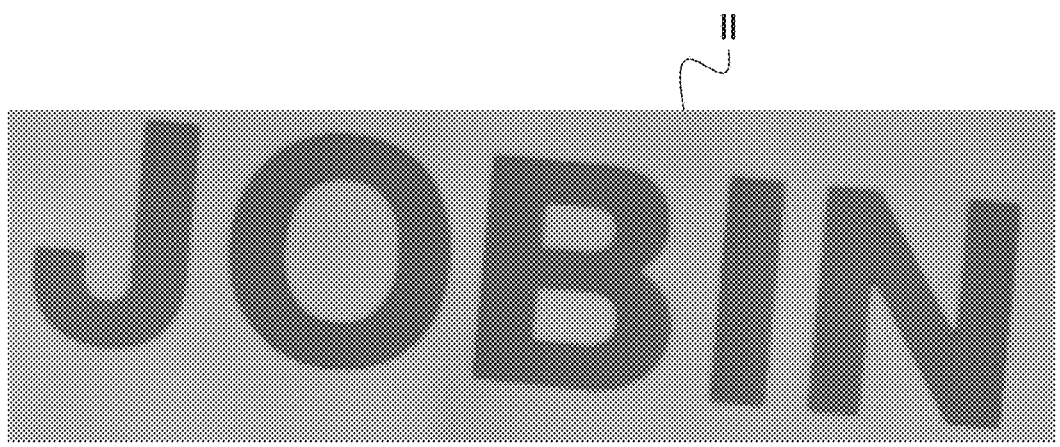
FIG. 4 illustrates an initial image of a sample.

An example of such an initial image II is represented in FIG. 4. In FIG. 4, sample 1 symbolizes the dark letters J, O, B, I and N on a light background.

Here, the initial image II is an RGB image where the intensity of each pixel comprises three components, a component for red, a component for green and a component for blue, all coded on 256 bits.

Whatever the mode of acquisition of the initial image II, the initial image II is composed of pixels possessing one or more intensities, here three intensities. Here, the pixels are conventionally distributed in rows and columns.

Preferably, the duration of acquisition of the initial image II is short compared to the duration of acquisition of the spectrometry image IS. The initial image II is for example acquired in a few fractions of a second while the spectrometry image IS is acquired in several minutes.

In step e1, a maximum set of N, $2 \leq N$, spectrometry measurement positions PM is defined. Here, the maximum number of measurement positions PM depends on the pitch DX along the X axis and on the pitch DY along the Y axis. The pitches DX, DY are chosen according to the resolution of the analysis instrument. The pitches DX, DY can for example be determined by the diameter of the measurement spot 6 and by the precision of the analysis instrument in the relative displacement of the excitation beam 2 with respect to the sample 1.

Here, the measurement positions PM therefore define a grid, with pitches DX and DY, the dimensions of which correspond to the area of sample 1 to be analyzed.

Each measurement position PM is identified with respect to sample 1 by at least one coordinate. Here, a measurement position is identified by two coordinates, a CX coordinate along the X axis and a CY coordinate along the Y axis.

The initial image II is preferably a high-resolution image. In practice, the resolution of the initial image II is at least as high as the pitch of the grid of the measurement positions PM. The coordinates of a measurement position PM can then correspond to a pixel of the initial image II. In the case where the resolution of the initial image II is higher than the pitch of the grid of the measurement positions PM, the coordinates of a measurement position PM can then correspond to several pixels.

Figure 5:
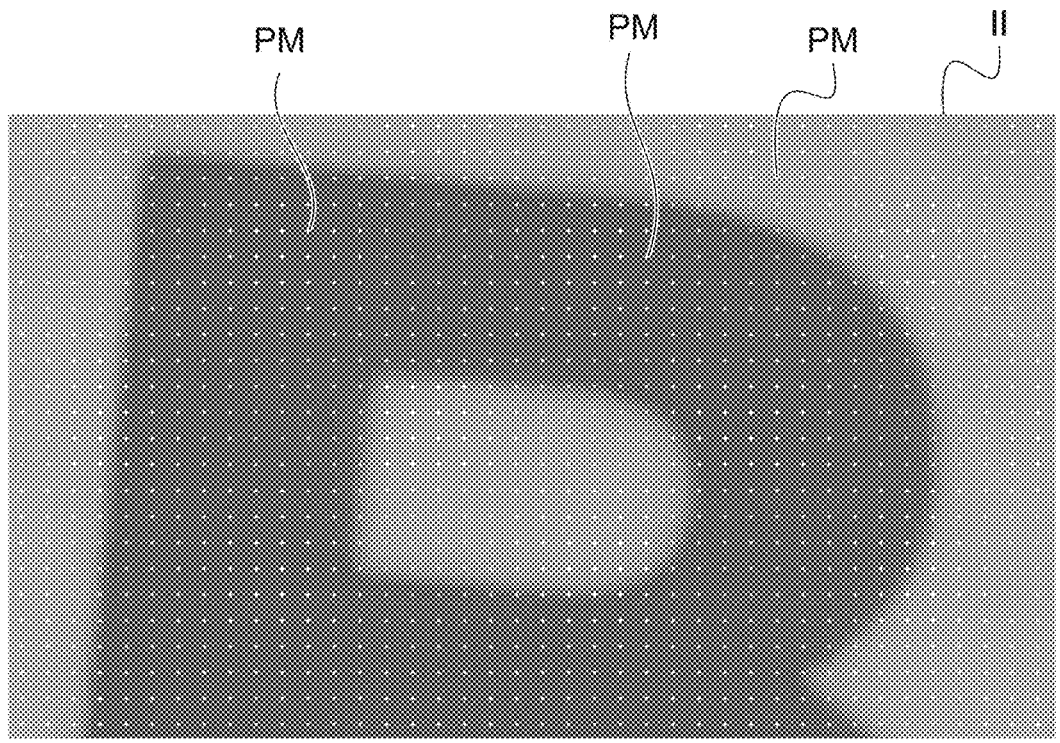
FIG. 5 is a magnification of the initial image of FIG. 4 with a distribution of the measurement positions.

In FIG. 5, the measurement positions PM, represented by "+" signs, are displayed superimposed on the initial image II. To avoid overloading the figure, only part of the measurement positions PM are represented. In practice, the grid of measurement positions PM can be at least 4 or 5 times denser than in the example of FIG. 5.

For example, in a given direction, two measurement positions PM can be approximately 4 pixels apart. The resolution of the initial image II is then about 16 times greater than the maximum spatial resolution of the spectrometry image IS.

Each measurement position PM also comprises at least one intensity I. The intensity of a measurement position PM is calculated on the basis of the intensity of the pixels of the initial image II located in a neighborhood of the measurement point.

A pixel is for example in the neighborhood of the measurement position PM closest to it. The number of pixels in the neighborhood of a measurement position PM can be estimated by the ratio between the number of pixels of the initial image II and the maximum number N of measurement positions PM. Still as an example, the neighborhood can depend on the dimensions of the measurement spot 6. The neighborhood of a measurement position PM can thus be defined by all pixels included in a circle centered on the measurement position PM and having dimensions substantially similar to the ones of measuring spot 6.

Here, the intensity of a measurement position PM is calculated by carrying out an interpolation, for example an average or a bicubic interpolation, of the intensities of the pixels PI located in its neighborhood V. In other words, the initial image II is sub-sampled so that the number of pixels after sub-sampling is equal to the maximum number N of measurement positions PM. Once the sub-sampling has been performed, the intensity of a measurement position PM then corresponds in a one-to-one manner to the intensity of a pixel of the initial image.

The intensity of a measurement position PM is therefore of the same nature as the intensity of a pixel of the initial image II. The intensity of a measurement position PM can then have the same number of components as the intensity of a pixel. Here, for example, the intensity of a measurement position PM comprises three components, a red component IR, a green component IG and a blue component IB.

In one embodiment, the intensity of a measurement position PM has additional components such as a component representative of the average intensity of the pixels of the neighborhood, a component representative of the maximum intensity of the pixels of the neighborhood or even a component representative of the minimum intensity of the pixels of the neighborhood. Here such additional components can be defined for each color: red, green and blue.

Step e2)

Once the coordinate(s) and the intensity of each measurement position PM are determined, the method makes it possible to assign a classification value to each measurement position PM.

For this, as shown in FIG. 3, the method comprises a step e2 of assigning a classification value to each of the N measurement positions PM on the basis of deviations between the measurement positions PM, a deviation between two measurement positions PM being calculated based on an intensity difference and a coordinate difference.

Step e2 makes it possible to order or classify all measurement positions PM from the most contributing to the least contributing (or vice versa) thanks to the classification values. As explained in the introduction, the classification value of a measurement position PM makes it possible to quantify the contribution of the measurement position PM in the formation of the spectrometry image IS.

The contribution of a measurement position PM represents the importance or the interest of acquiring a spectrometry measurement at this measurement position to improve the quality of the spectrometry image IS. Spectrometry measurements are then acquired based on the classification values, usually starting with the most contributing measurement positions. The spectrometry image is reconstructed and updated in real time on the basis of the spectrometry measurements actually acquired.

For example, at a given time when j, $1 \leq j \leq N$, spectrometry measurements have been acquired, the $j+1^{th}$ most contributing Measurement position PM is the one at which the acquisition of the $j+1^{th}$ measurement of spectrometry will increase the quality of the spectrometry image IS the most. As described further down, the quality of the spectrometry image IS at j+1 spectrometry measurements can be estimated on the basis of the initial image II. The quality of the spectrometry image IS with j measurements may correspond to a difference with the spectrometry image IS with N spectrometry measurements, that is to say with the spectrometry image IS which would be acquired for an acceleration factor of 1.

This classification is made on the basis of the coordinate (s) and the intensity of the measurement position PM. The classification is therefore carried out on the basis of the initial image II.

The deviation between two measurement positions is calculated on the basis of an intensity difference and a coordinate difference. The deviation is therefore representative of the similarity, both spatial and in intensity, between two measurement positions PM. The smaller the deviation, the more similar the measurement positions PM are.

In practice, if the deviation between two measurement positions PM is small, acquiring a spectrometry measurement only at one of the two measurement positions PM is sufficient to construct a spectrometry image. The missing spectrometry measurement can be estimated based on the acquired spectrometry measurement. One of the two measurement positions PM can then be considered as contributing little since it is not a priority to acquire a spectrometry measurement there.

To calculate a deviation between two measurement positions PM, the calculator here performs a weighted sum of the square of the intensity difference between the two measurement positions and of the square of the coordinate difference between the two measurement positions.

For example, here, with a first measurement position PM located at coordinates CX1, CY1 and whose intensity components are IR1, IG1, IB1 and with a second measurement position PM located at coordinates CX2, CY2 and whose intensity components are IR2, IG2, IB2, the deviation E can be given by the formula:

$$E=(IR1-IR2)^2+(IG1-IG2)^2+(IB1-IB2)^2+R*((CX1-CX2)^2+(CY1-CY2)^2).$$

Here, the intensity components IR1, IG1, 1B1, IR2, IG2, IB2 are 8-bit coded values between 0 and 255. The coordinates CX1, CY1, CX2, CY2 are the values of the indices defining the location of the measurement position on the grid as represented in FIG. 2. The coordinates CX1, CY1, CX2, CY2 are whole numbers here, for example between 1 and square root of N for a square grid.

Alternatively, a deviation can be calculated as a weighted sum of the intensity difference between the two measurement positions and the square of the coordinate difference between the two measurement positions. Still as a variant, a deviation can be calculated as a weighted sum of the average of the intensities of the two measurement positions and of the average of the coordinates between the two measurement positions.

Here, the weighting coefficient R makes it possible to weight the difference in coordinates with respect to the difference in intensity. The weighting coefficient R can be adjusted manually by a user or automatically on the basis of the contrast variations present on the initial image II. In practice, the weighting coefficient R can take a value between 30 and 100 for an initial image comprising differences in intensity between pixels of light areas and pixels of dark areas greater than 100.

The weighting coefficient R used for the calculation of the deviations remains constant during step e2, that is to say for the classification of all measurement positions PM.

Advantageously, the weighting coefficient R makes it possible to adapt the calculation of the deviations to the sample 1. For example, the more the initial image II has high spatial frequencies, the lower the weighting coefficient R. The similarity between two measurement positions PM is then mainly based on the intensity. Still as an example, if the initial image II has small variations in contrast over relatively large portions of the initial image II, the weighting coefficient can be high. The similarity between two measurement positions PM is then mainly based on the coordinates.

The value of the weighting coefficient R can also be proportional to an overall contrast of the initial image II to maintain a balance between the difference in coordinates and the difference in intensity. This makes it possible, for example, to assign a significant weighting to the difference in coordinates even in the case of very strong differences in intensity.

In the embodiment where the intensity of a measurement position has the additional components, the calculation of the deviation takes these additional components into account.

Advantageously, during step e2, the calculator constructs a list S comprising the measurement positions PM whose classification value remains to be assigned, that is to say the measurement positions which remain to be ordered. The calculator also constructs a list U comprising the measurement positions PM whose classification value is assigned, that is to say the measurement positions PM already ordered.

For example, after the definition of the N measurement positions PM, all measurement positions PM remain to be ordered. List S then contains N measurement positions PM and list U no measurement positions PM. As another example, if the calculator has assigned a classification value to j measurement positions, the list S contains N−j measurement positions PM and the list U contains j measurement positions PM.

In a first embodiment, represented in FIG. 3, to assign a classification value to each measurement position PM of list S, the calculator iterates steps e21 and 22:

e21) for each measurement position PM of list S, determining a total error;

e22) selecting a measurement position PM from the list S based on each total error determined in step e21), assigning a classification value to the selected measurement position PM and moving the measurement position PM selected from list S to list U.

At the end of step e21, each measurement position PM of list S is associated with a total error.

For example, if steps e21 and e22 have already been performed j−1 times, which means that the calculator has assigned a classification value to j−1 measurement positions PM, at iteration j of step e21, the calculator determines j total errors. The determination of the total error will be described further down. Then, at iteration j of step e22, the calculator selects a measurement position PM, from among the j measurement positions PM of the list S, as a function of the total errors, and assigns a classification value to the selected measurement position PM.

More specifically, during an iteration of step e22, the calculator selects the measurement position PM associated with the lowest total error.

As described below, the total error here represents the contribution of all already classified measurement positions PM, that is those to which a classification value has been assigned. During an iteration of step e22, the contribution of a selected measurement position PM can for example be estimated by the difference between a total error before classification, that is to say before moving this measurement position in list U, and a total error after classification, that is after moving this measurement position in list U.

Here, before the iteration of steps e21 and e22, a classification value is initialized at a predetermined value and at each iteration of step e22, a classification value strictly lower, respectively higher, than the lowest, respectively the highest, classification value is assigned to the measurement position PM associated with the lowest total error. Two examples of assigning rank values are detailed below.

The calculator then assigns a classification value to the selected measurement position. The calculator assigns for example only classification values strictly higher than the preceding ones or only classification values strictly lower than the preceding ones. The previous classification values are the classification values already assigned to previous iterations or equal to a predetermined initialization value.

If the calculator assigns classification values strictly greater than the previous ones, the measurement positions PM are ordered, at the end of step e2, from the least contributing to the most contributing according to the increasing classification values.

In practice, to do this, a rank value can be initialized to zero. Then, each selected measurement position PM is assigned a rank value incremented by +1 from the previous one. Thus, the least contributing measurement position PM has a classification value of 1 and the most contributing a classification value of N.

If the calculator assigns classification values that are strictly lower than the previous ones, the measurement positions PM are ordered, at the end of step e2, from the most contributing to the least contributing according to the increasing classification values.

In practice, to do this, a classification value can be initialized to N+1. Then, each selected measurement position PM is assigned a rank value incremented by −1 from the previous one. Thus, the least contributing measurement position PM has a classification value of N and the most contributing a classification value of 1.

Once the calculator has assigned a classification value to a selected measurement position PM, this selected measurement position PM is moved from list S to list U. After j iterations of steps e21 and e22, list S contains N−j measurement positions PM and list U contains j measurement positions PM.

To assign a classification value to each measurement position PM in list S, the calculator iterates steps e21 and 22 until there are no more measurement positions PM in list S. Here, this corresponds to N iterations of steps e21 and e22.

In this first embodiment, at step e21, the determination of a total error associated with a considered measurement position PM of the list S is done by iterating steps e211, e212 and e213:

e211) moving of a considered measurement position PM from list S to list U;
e212) calculation of the total error associated with the considered measurement position PM on the basis of deviations between measurement positions PM of the list S and measurement positions PM of the list U;
e213) moving of the considered measurement position PM from list U to list S.

Here, at step e221, the total error associated with the considered measurement position PM is calculated on the basis of the deviations between each measurement position PM of the list U and each measurement position PM of the list U or between each measurement position PM of list U and measurement positions PM of list S.

As shown in FIG. 3, step e212 for determining the total error associated with the considered measurement position comprises sub-steps e2121 and 2122:

e2121) for each measurement position PM of list U, determination of the measurement position of the list S with which the deviation is minimum, the value of the deviation between these two measurement positions defining a minimum deviation;
e2122) calculation of the total error on the basis of each minimum deviation determined in step e2121).

At step e2121, for each measurement position PM of list U, the calculator determines the measurement position of list S with which the deviation is minimum. The calculation of a deviation is detailed further down. The value of this minimum deviation is saved.

For example, during iteration j of step e21, after moving the considered measurement position PM from list S to list U at step e212, list S contains N−j measurement positions PM and list U contains j measurement positions PM. The calculator can then calculate (N−j)×j deviations between the measurement positions PM of list S and the measurement positions PM of list U.

Remarkably, to reduce the number of calculations and therefore the calculation time, it is possible to calculate only certain deviations to determine the minimum deviation of a measurement position PM from list U. For example, here, the first calculated deviations are those between the measurement position PM of list U and the measurement positions PM of list S located the closest spatially, i.e. those with which the difference in coordinates, hereinafter called distance, is the lowest. The deviations are then calculated in ascending order of coordinate difference. Depending on the deviations already calculated, it is possible to stop the calculations if the contribution of the difference in coordinates is greater than the smallest deviation already calculated. The minimum deviation is then necessarily part of the deviations already calculated.

Here, the total error is equal to the sum of each minimum deviation determined in step e2121. For example, during iteration j of step e21, after having calculated (N−j)×j deviations and determined j minimum deviations, the calculator calculates the total error associated with a measurement position PM by performing the sum of the j minimum deviations for this measurement position PM.

Once the total error associated with the considered measurement position PM is determined, the calculator moves, in step e213, the considered measurement position PM from the list U to the list S.

By iterating steps s e211, e212 and 213, the calculator therefore associates a total error with each measurement position PM of the list S. As described previously, this then makes it possible to assign a classification value to the associated measurement position PM at the smallest total error. For example, during iteration j of step e21, this makes it possible to assign a classification value to the measurement position PM associated with the lowest total error among the j measurement positions of the list S.

In a second embodiment (not shown), in step e21, the calculator determines a change in total error associated with each measurement position PM. The change in total error is here a difference between two total errors, for two measurement positions PM, for example calculated in accordance with steps e2121 and e2122. The change in total error can also be a difference between a first total error, called initial total error, calculated before the measurement position PM under consideration is moved from list S to list U, and a second total error calculated after the considered measurement position PM is moved from list S to list U.

During a given iteration of step e21, the measurement position of the list S which is considered to contribute the least is the one which is associated with the smallest change in total error. This means that at step e22, the measurement position selected is that which is associated with the smallest change in total error.

Calculating total error changes, rather than total errors, allows to study a variation of total error from one considered measurement position PM to another considered measurement position PM, rather than calculating a total error for each considered measurement position.

Indeed, for example, it is not necessary to completely calculate the total error associated with a considered measurement position PM. For this, provision is made to calculate a local error, on the basis only of the deviations in a neighborhood of the considered measurement position PM. This neighborhood is for example defined for each considered measurement position PM on the basis of the minimum deviation. The measurement positions PM which, due to the difference in coordinates, necessarily lie spatially too far away to correspond to the minimum deviation are excluded from the neighborhood. This neighborhood can also be defined by a predetermined threshold value on the coordinate difference.

The local error makes it possible to estimate the change in total error since the considered measurement position only has an influence in its neighborhood.

Moreover, at each new iteration of step e21, it is possible to estimate the new initial total error without having to calculate deviations. For this, the change in total error associated with the measurement position selected at the previous iteration can be subtracted from the initial error of the previous iteration. This makes it possible not to recalculate the initial total error and thus to reduce the number of calculations.

Figure 6:
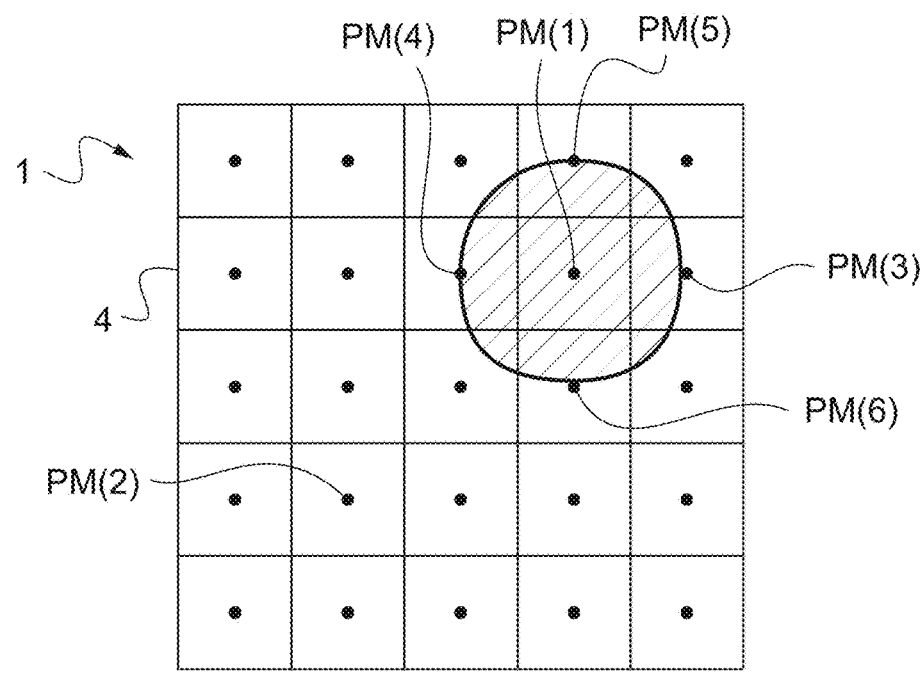
FIG. 6 represents an example of classification of measurement positions with respect to a simulated initial image.

FIG. 6 represents an example of classification of measurement positions PM on the basis of a simulated initial image. This simulated initial image has a dark circle on a light background, that is to say two zones with two distinct intensities. The grid on which the N measurement positions PM are placed has intentionally a high pitch for ease of understanding.

In FIG. 7, the six most contributing measurement positions PM are shown in ascending order of classification value. Two measurement positions PM(1), PM(2) can make it possible to estimate respectively the light zone and the dark zone represented by hatching. The measurement positions PM(3), PM(4), PM(5), PM(6) are the next most contributory because these measurement positions PM(3), PM(4), PM(5), PM(6) improve the resolution at the edge of the dark area.

Once all measurement positions have been ordered, it is possible to estimate the spectrometry image IS acquired with a determined spectrometry measurement number less than the maximum number N. This is presented further down after describing the construction step of the spectrometry image IS.

Step e3

Once all measurement positions PM have been ordered, for example from the most contributing to the least contributing, the calculator can define a group of measurement positions PM from among the most contributing.

Thus, in step e3, the calculator determines a group of P, $1 \leq P \leq N$, measurement positions PM from among the set of N measurement positions PM as a function of the classification values assigned in step e2.

To determine the group of P measurement positions PM, the calculator selects the P most contributing measurement positions thanks to the classification values assigned to the measurement positions PM in step e2.

In other words, in step e3, the P measurement positions PM of the group are determined according to an ascending, respectively descending, order of the classification values.

For example, in the case where in step e2, the calculator increments by +1 the classification values from the least contributing to the most contributing measurement position PM, the P measurement positions of the group are those to which the P highest classification values are attributed. In this case, the P measurement positions PM of the group are determined according to a decreasing order of the classification values, from the highest to the lowest.

Still as an example, in the case where in step e2, the calculator increments by −1 the classification values from the least contributing to the most contributing measurement position PM, the P measurement positions of the group are those to which the P lowest classification values are attributed. In this case, the P measurement positions PM of the group are determined according to an increasing order of the classification values, from the lowest to the highest.

The number P of measurement positions PM can for example be determined so as to reach a given acceleration factor. For example, to reach an acceleration factor of 10, the number P of measurement positions PM of the group is equal to N/10. This represents, at step e4, acquisitions of spectrometry measurements at only 10% of the measurement positions PM.

The number P of measurement positions PM can for example be predetermined by a user.

The number P of measurement positions PM can for example be determined so as to reach a given acquisition duration or a distance traveled by the excitation beam 2 with respect to the sample 1 which has been given during step e4. In these cases, the number P of measurement positions PM in the group depends on the location of the measurement positions PM with respect to sample 1.

The number P of measurement positions PM can also be determined by defining a threshold value on the total errors. After classification in step e2), the total error associated with each measurement position PM can be stored in memory. The number P can then be determined so that the sum of the total errors associated with the measurement positions which are not selected in the group is less than the threshold value.

An additional criterion can be used when determining the number P of measurement positions PM. The number P of measurement positions PM can be determined so that the greatest distance between two measurement positions PM is less than a threshold value. The threshold value can for example be equal to 15 times the pitch DY or DY.

Step e4

Once the group containing the P most contributing measurement positions PM has been determined, spectrometry measurements can be acquired at the P measurement positions PM of the group.

Thus, at step e4, successively, for each measurement position of the group determined in step e3, the excitation beam 2 is positioned at the measurement position PM on the area of the sample 1, a spectrometry measurement is acquired, and the spectrometry image IS is constructed based on the acquired spectrometry measurement(s).

Here, the spectrometry image IS is updated after each new acquisition of a spectrometry measurement. The spectrometry image IS is therefore constructed progressively and dynamically during step e4, that is to say at the same time as the acquisitions of the spectrometry measurements. This makes it possible to continuously improve the quality of the spectrometry image IS during the acquisition of each new spectrometry measurement.

The order of acquisition of the spectrometry measurements can for example be made as a function of the classification values assigned to the P measurement positions PM of the group, for example so as to acquire spectrometry measurements from the most contributing measurement position PM to the least contributing.

According to a particular and advantageous variant, when the group comprises at least 3 measurement positions PM, a trajectory for carrying out the successive positionings of the excitation beam can be predetermined. This means that the order of acquisition of the spectrometry measurements, at the P measurement positions PM of the group, can be done according to a predetermined trajectory of the excitation beam 2 with respect to the sample 1.

This trajectory can in particular be determined so as to optimize the displacement of the excitation beam 2 with respect to the sample 1. This optimization can for example consist in minimizing the distance traveled by the excitation beam 2 with respect to the sample 1 during its successive positioning at all measurement positions PM of the group. This optimization can also, for example, consist in minimizing the number of changes of direction of a displacement stage of the sample holder. This optimization can also consist in minimizing the time required to successively position the excitation beam 2 in all P measurement positions PM of the group.

Step e4 includes the construction of the spectrometry image IS. The maximum spatial resolution of the spectrometry image IS particularly depends on the maximum set N of measurement position PM. Here, the spatial resolution depends for example on the chosen displacement pitches DX, DY. The spatial resolution of the spectrometry image IS also depends on the spectrometry measurements that have been acquired.

In general, with the method of acquiring and forming the spectrometry image IS, the spatial resolution is not homogeneous over the entire spectrometry image IS. Indeed, since the areas of sample 1 with strong spatial variations in intensity correspond to the most contributing measurement positions PM, more spectrometry measurements are acquired in these areas, and the spectrometry image IS then has a superior spatial resolution in these areas.

The spatial resolution of the spectrometry image therefore increases locally with each acquisition of a spectrometry measurement at a measurement position PM.

Here, the spectrometry image IS is composed of spectrometry pixels. The spectrometry image IS is here composed of as many spectrometry pixels as there are measurement positions in the maximum set N.

Here, since the measurement positions PM are arranged in a grid, that is in rows and columns, as shown in FIG. 5 or 6, the spectrometry image IS is composed of spectrometry pixels as arranged in rows in columns. Each spectrometry pixel here comprises a spectrometry value representative of the spectrometry measurement. A spectrometry value can, for example, represent a spectrum, a portion of a spectrum, the intensity of a narrow spectral band, the intensity of a single wavelength or information from a multivariate analysis or a specific analysis.

As shown in FIG. 3, in a preferred embodiment, the construction of the spectrometry image IS comprises substeps e41 and e42:

e41) for each measurement position PM for which a spectrometry measurement has been acquired, determining a spectrometry value based on the spectrometry measurement;

e42) for each remaining measurement position, determining a spectrometry value on the basis of at least one selected spectrometry measurement, which is selected as a function of the difference in coordinates between the remaining measurement position and the position of extent at which said at least one selected spectrometry measurement was acquired.

The remaining measurement positions PM are the measurement positions PM for which no spectrometry measurement has been acquired. Here, therefore, the remaining measurement positions are the measurement positions PM which are not taken into account during step e41.

In steps e41 and e42, the spectrometry image IS is constructed by determining for each measurement position PM, that is to say for each spectrometry pixel, a spectrometry value.

At step e41, the calculator determines the spectrometry value of each measurement position PM at which a spectrometry measurement has been acquired, called acquired measurement position, on the basis of this spectrometry measurement. The spectrometry value of an acquired measurement position can for example be equal to the spectrometry measurement or equal to a factor, that is to say equal to the spectrometry measurement at a wavelength or in a narrow wavelength band.

If k, $1 \leq k \leq N$, spectrometry measurements have been acquired, the k spectrometry values of the k acquired measurement positions are determined based on their respective spectrometry measurement.

At step e42, the calculator determines the spectrometry value of each remaining measurement position, that is to say the measurement positions PM which are not acquired measurement positions. Subsequently, the term "considered" remaining measurement position is that for which the spectrometric value is determined at a given instant.

To determine the spectrometry value of the considered remaining measurement position, the calculator takes into account at least one spectrometry measurement acquired at an acquired measurement position. The acquired measurement position or positions are selected as a function of their coordinate difference with the considered remaining measurement position. The difference in coordinates between two measurement positions PM is called distance.

Here, in step e42, the selected spectrometry measurements are the spectrometry measurements acquired at acquired measurement positions having a distance with the considered remaining measurement position that is less than a minimum distance threshold value. This means that all acquired measurement positions whose distance with the remaining measurement position considered is less than the minimum distance threshold value are selected. The spectrometry value can then for example be determined on the basis of an average of all selected spectrometry measurements.

In addition, regardless of the selected spectrometry measurement(s), the spectrometry value is here determined based on each selected spectrometry measurement weighted by the deviation between the acquired measurement position at which the selected spectrometry measurement was acquired and the considered remaining measurement position.

Here, the calculation of the deviation between two measurement positions PM is identical to that described previously, that is a weighted sum of the square of the difference in intensity between the two measurement positions and the square of the coordinate difference between the two measurement positions. Here, the weighting coefficient R is identical at step e2 and at step e4. As a variant, provision may be made for the weighting coefficient R to be different at steps e2 and e4.

Here, the weighting is inversely proportional to the deviation. The farther the acquired measurement position is away from the considered remaining measurement position, that is to say the greater the deviation, the lower the weight of its spectrometry measurement.

For example, the spectrometry value is determined on the basis of two spectrometry measurements and a first acquired measurement position has a deviation twice as large as the second one with the considered remaining measurement position. Then, when determining the spectrometry value, the acquired spectrometry measurement at the second acquired measurement position can have a weighting twice that of the acquired spectrometry measurement at the first acquired measurement position.

In other words, the spectrometry value of a remaining measurement position is determined based on one or more spectrometry measurements acquired at one or more nearby acquired measurement positions, the proximity between the measurement positions PM being quantified by the deviations between these measurement positions PM.

In some cases, it is planned to assign no spectrometry value to some remaining measurement positions. The spectrometry image is then incomplete. Not assigning a spectrometry value to a remaining measurement position can for example be based on a minimum distance threshold value. If no acquired measurement position has a distance to the remaining measurement position that is less than the minimum distance threshold value, no spectrometry value is assigned to the remaining measurement position. This means that if no acquired measurement position is spatially close enough to the remaining measurement position, no spectrometry value is assigned to the remaining measurement position.

FIGS. 7A, 7B, 7C, 7B, 7E and 7F show the spectrometry image IS of sample 1 of FIG. 4 at several acceleration factors. In these figures, the spectrometry values of the remaining measurement positions are equal to the spectrometry measurement of the nearest acquired measurement position.

Figure 7A:
FIG. 7A illustrates a Raman spectrometry image of the sample of FIG. 4 constructed by using the method of FIG. 3 for an acceleration factor of 100.
Figure 7B:
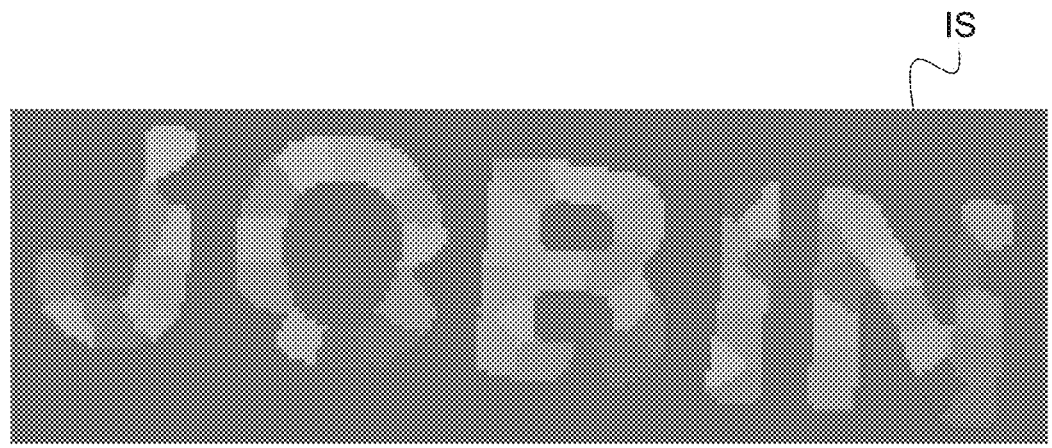
FIG. 7B illustrates a Raman spectrometry image of the sample of FIG. 4 constructed by using the method of FIG. 3 for an acceleration factor of 50.
Figure 7C:
FIG. 7C illustrates a Raman spectrometry image of the sample of FIG. 4 constructed by using the method of FIG. 3 for an acceleration factor of 20.
Figure 7D:
FIG. 7D illustrates a Raman spectrometry image of the sample of FIG. 4 constructed by using the method of FIG. 3 for an acceleration factor of 10.
Figure 7E:
FIG. 7E illustrates a Raman spectrometry image of the sample of FIG. 4 constructed by using the method of FIG. 3 for an acceleration factor of 5.
Figure 7F:
FIG. 7F illustrates a Raman spectrometry image of the sample of FIG. 4 constructed by using the method of FIG. 3 for an acceleration factor of 1.

In FIG. 7A the acceleration factor is 100, in FIG. 7B the acceleration factor is 50, in FIG. 7C the acceleration factor is 20, in FIG. 7D the acceleration factor is 10, in FIG. 7E the acceleration factor is 5, and in FIG. 7F the acceleration factor is 1. Note that the quality of the spectrometry image does not increase by regular way.

Indeed, in FIG. 7A, the spectrometry image IS constructed on 1% of the measurement positions PM, the most contributory ones, already makes it possible to distinguish the contrasts of sample 1. The quality of the spectrometry image IS increases significantly if it is constructed on 2% or respectively 5% of the measurement positions PM as in FIGS. 7B and 7C respectively. Then, acquiring spectrometry measurements in 10%, as in FIG. 7D, respectively 20%, as in FIG. 7E, or in all measurement positions as in FIG. 7F does not significantly increase the quality of the spectrometry image IS since spectrometry measurements have already been acquired at the most contributing measurement positions PM. Even with a high acceleration factor, it is possible to distinguish the word JOBIN here.

As mentioned above, once all measurement positions PM have been ordered, it is possible to estimate the spectrometry image IS that can be acquired with a given number of spectrometry measurements. It is indeed possible to calculate deviations between the pixels of the initial image II in the same way as between measurement positions PM. It is therefore possible to construct an estimated structural image IE on the basis of only certain pixels, called source pixels PS, corresponding to the most contributing measurement positions.

Figure 8:
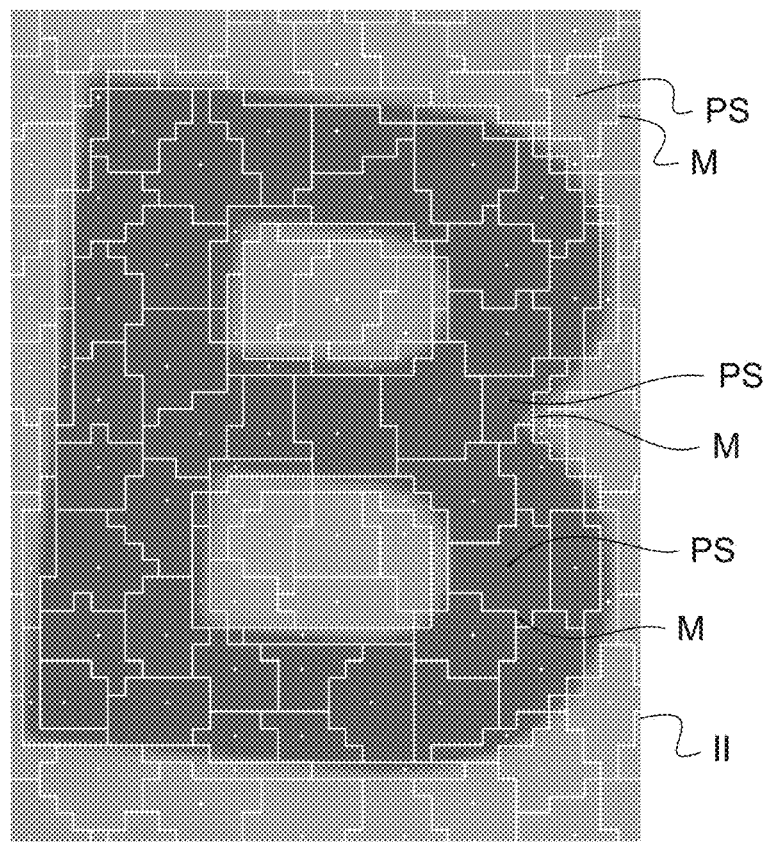
FIG. 8 illustrates the initial image of FIG. 4 with a distribution of source pixels and their associated meshes for an acceleration factor of 20.

In the estimated structural image IE, the intensity of a pixel which is not a source pixel PS can be determined on the basis of the nearest source pixel PS, that is having the lowest deviation. All pixels whose intensity is estimated on the basis of a source pixel PS form a mesh M associated with this source pixel PS. FIG. 8 shows, superimposed with part of the initial image II and centered on the letter B, the location of the source pixels PS for an acceleration factor of 20 and their associated mesh M.

Figure 9:
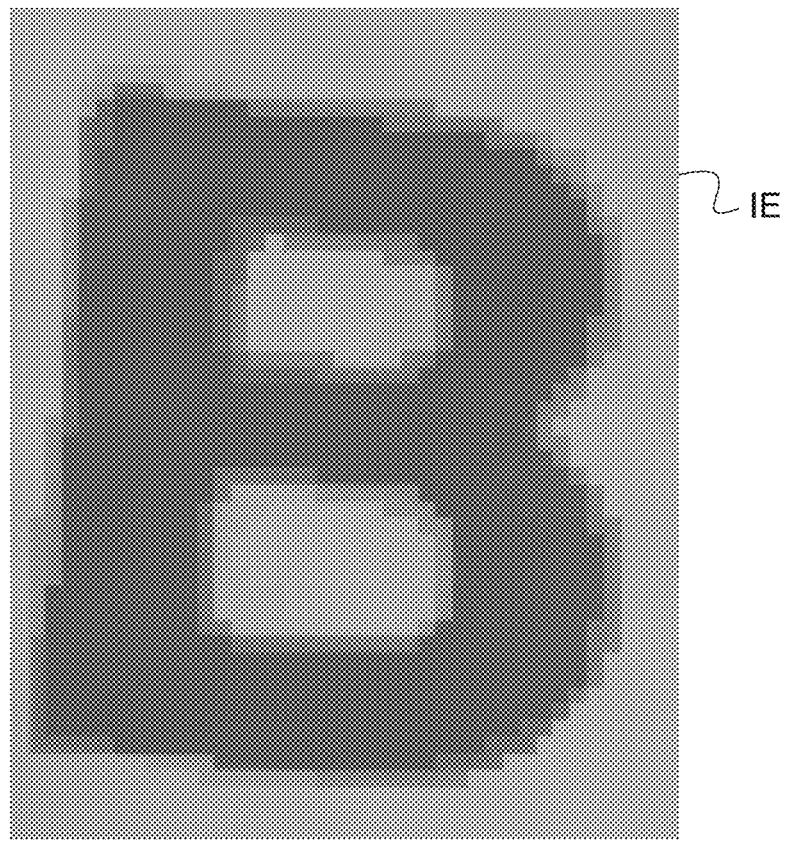
FIG. 9 illustrates an estimated structural image, for an acceleration factor of 20, constructed on the basis of the initial image of FIG. 4 and the source pixel distribution of FIG. 8.

FIG. 9 shows the estimated structural image IE of sample 1 corresponding to FIG. 8. The acceleration factor, here of 20, makes it possible to determine the N/20 most contributing measurement positions corresponding to N/20 source pixels PS of the initial image II.

Figure 10:
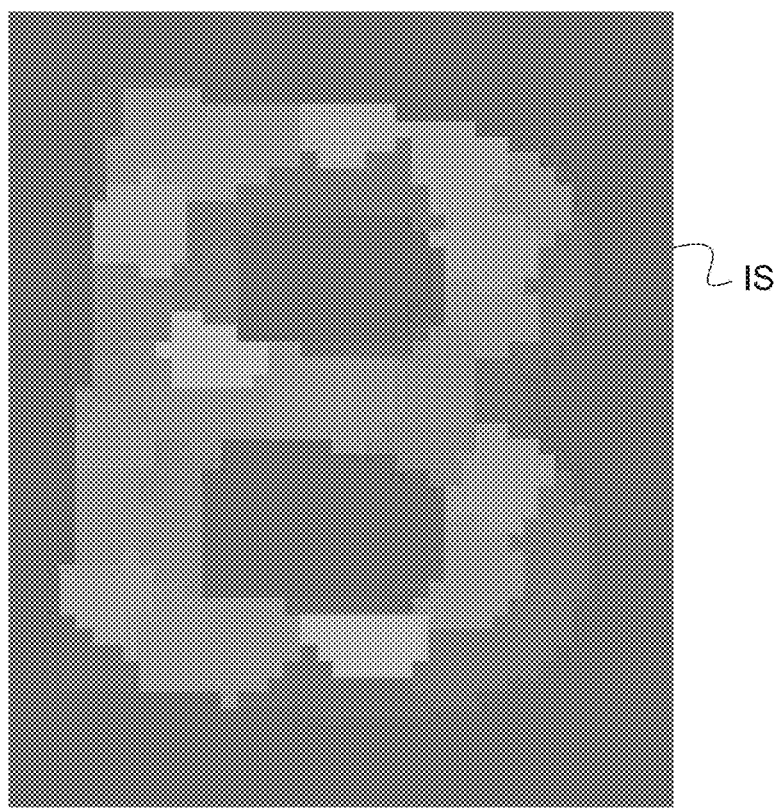
FIG. 10 is a magnification of the spectrometry image of FIG. 7C corresponding to the estimated structural image of FIG. 9 at the same acceleration factor of 20.

FIG. 10 is a magnification of the spectrometry image IS of FIG. 7C centered on the letter B, and obtained with the same acceleration factor of 20.

Remarkably, the spatial resolution of the estimated structural image IE of FIG. 9 is very close to that of FIG. 10 since these two images were constructed according to a similar process, one on the basis of the N/20 source pixels PS, the other on the basis of N/20 spectrometry measurements acquired at the most contributing measurement positions PM.

This estimation of the spectroscopy image IS, thanks to the estimated structural image IE, can for example help a user to select a given acceleration factor.

Remarkably, steps e3 and e4 are iterated to improve the spatial resolution of the spectrometry image IS, at each new iteration, the group determined in step e3 includes only measurement positions PM for which a spectrometry measurement remains to be acquired, that is to say positions of remaining measurements. In other words, for each iteration of step e3, the measurement positions PM for which a spectrometry measurement has been acquired are not taken into account when determining the group. At each new iteration of step e3, thanks to the classification carried out in step e2, the group is therefore determined by selecting the most contributing remaining measurement positions.

For example, during a first iteration of steps e3 and e4, N/100 spectrometry measurements are acquired at the N/100 most contributing measurement positions PM. This provides a spectrometry image IS with an acceleration factor of 100. During a second iteration, N/100 other spectrometry measurements are acquired at the N/100 following most contributing measurement positions. The second iteration provides a spectrometry image IS with an acceleration factor of 50.

In this example, the trajectory of the excitation beam 2 with respect to the sample 1 can be optimized during each iteration, that is to say for each group of N/100 measurement positions PM.

During the different iterations of steps e3 and e4, the different groups can also have a different number of measurement positions PM. This is for example the case if the number of measurement positions PM per group is determined so as to obtain a given distance traveled by the excitation beam 2 with respect to the sample 1.

Several conditions for stopping the method of acquiring and forming a spectrometry image IS can be implemented and sometimes combined with each other.

A first stopping condition may be that the number of spectrometry measurements to be acquired is predetermined.

This first stopping condition corresponds for example to the case where the desired acceleration factor of the spectrometry image is given. For example, if the acceleration factor to be reached is 10, the number of spectrometry measurements to be acquired is N/10. Thanks to the acquisition method, the N/10 measurements are then acquired at the N/10 most contributing measurement positions, which makes it possible to obtain an image of very good quality for a given acceleration factor.

For this first stopping condition, provision can be made for the group, determined in step e3, to contain a number P of measurement positions PM equal to the number of spectrometry measurements to be acquired and for the trajectory of the excitation beam to be optimized on all P measurement positions PM of the group. This makes it possible to obtain a spectrometry image IS at the determined acceleration factor in a minimum of time.

A second stopping condition can be that the acquisition duration is predetermined. The method of acquiring and forming the spectrometry image IS then makes it possible to obtain a spectrometry image IS of better quality than the methods of the state of the art for a given acquisition duration.

The number of measurement positions PM per group can be predetermined, for example fixed at N/100 to correspond to an acquisition step of 1% of the spectrometry measurements that can be acquired.

A third stopping condition may be that the method includes a stopping measure to end, for example during step e4, the acquisition of additional spectrometry measurements. The acquisition of new spectrometry measurements can then be stopped at any time, including before reaching a given acceleration factor or a given acquisition duration.

This stopping measure can for example consist of a user input. The user input can be performed for example via a peripheral of the keyboard type connected to the calculator. Thus, if the user considers that the quality of the spectrometry image IS, constructed at a given instant with a certain number of spectrometry measurements, is satisfactory, he can decide to stop the acquisition of new spectrometry measurements. This means here that the user can terminate, when he wishes, the process of acquisition and formation of the spectrometry image IS.

According to a particular and advantageous embodiment, as shown in FIG. 3, step e4 here comprises sub-step e43.

At step e43, the calculator interpolates the spectrometry image IS by determining a plurality of interpolation coefficients on the basis of the deviations between the measurement positions PM. Once the spectrometry image IS has been constructed in steps e41 and e42, the interpolation makes it possible to improve the visual rendering of the spectrometry image IS.

Figure 11A:
FIG. 11A illustrates an interpolation step performed on the Raman spectrometry image of FIG. 7A.
Figure 11B:
FIG. 11B illustrates an interpolation step performed on the Raman spectrometry image of FIG. 7B.

This interpolation makes it possible to adjust the spectrometry values as a function of neighboring spectrometry values. FIGS. 11A and 11B illustrate the interpolation step, making it possible to form interpolated images IP, applied respectively to the spectrometry images IS of FIGS. 7A and 7B.

The interpolation can for example be a polynomial interpolation.

Here, the interpolation coefficients are determined based on the deviations between the measurement positions PM. The interpolation coefficients are inversely proportional to the deviations.

For example, the smaller the deviation between two measurement positions PM, the higher the interpolation coefficient between the two spectrometry values associated with these two measurement positions PM. Thus, for a given measurement position PM, its spectrometry value is mainly adjusted based on the nearby measurement positions, spatially and in terms of intensity.

As shown in FIGS. 11A and 11B, step e43 of interpolation of the spectrometry image IS can make it possible to obtain more quickly an interpolated image IP of quality deemed satisfactory by a user.

In the context of the third stopping condition, the stopping measure can then be triggered more quickly, on the basis of the interpolated image IP, which represents a time saving.

Optional Steps

As shown in FIG. 3, provision can be made for the acquisition method to include a step e11.

In step e11, at least one initial spectrometry measurement is acquired at at least one predetermined initial measurement position, a predetermined classification value is assigned to each initial measurement position.

During the construction of the lists S and U, the calculator places the initial measurement positions in the list U since these have classification values.

In practice, several initial spectrometry measurements are acquired at step e11. These spectrometry measurements are for example distributed over an initial grid with pitches greater than the pitches DX and DY of the grid over which the set N of measurement positions PM are distributed.

For example with a pitch 10 times greater than DX and DY respectively in the X direction and the Y direction. The initial grid comprises N/100 of the N measurement positions PM. Acquiring measurements at these N/100 measurement positions PM makes it possible to obtain a spectrometry image IS with an acceleration factor of 100, that is to say in 1% of the standard acquisition time.

This makes it possible to quickly form a spectrometry image IS of low quality but covering the whole of sample 1. Then, spectrometry measurements are acquired at the other most contributing measurement positions to quickly increase the quality of the spectrometry image IS.

The classification values of the initial measurement positions are assigned so as not to disturb the classification of the other measurement positions PM. The classification values can for example all be set to the same value, for example to the initialization value described above.

It is then simple to define a criterion associated with these initial measurement positions so that the initial measurement positions are not taken into account when determining the group in step e3. This means that the initial measurement positions are considered as acquired measurement positions.

The initial measurement positions are placed in the list U. Indeed, in step 2, the initial measurement positions are taken into account in the allocation of the classification values of the other measurement positions PM.

Remarkably, provision can be made to predetermine a region of interest in the initial image II comprising only part of the measurement positions PM and in step e3 the group can then be determined on the basis of the measurement positions PM belonging to the region of interest.

The region of interest can for example be defined by the user on the initial image II. The user can for example draw a rectangle or a circle on the initial image. The coordinates of the measurement positions PM make it possible to determine which are located in the region of interest.

The area of the region of interest is smaller than the area of sample 1. Therefore, only a part of all N measurement positions PM falls within the region of interest. During step e3, the measurement positions PM of the group are then selected only from those belonging to the region of interest.

At step e4, the spectrometry measurements are therefore acquired only at measurement positions PM belonging to the region of interest.

Determining a region of interest therefore makes it possible to acquire spectrometry measurements only at a particular location of the sample 1. Therefore, the spatial resolution and the quality of the spectrometry image IS increase only in this particular location. To increase the quality of the spectrometry image IS in the region of interest, steps e3 and e4 can be iterated by considering only the measurement positions PM in the region of interest.

Determining a region of interest makes it possible to refine the spectrometry image IS, that is to say increase its spatial resolution, only in a particular place of the sample 1. The user can for example define a region of interest where sample 1 exhibits strong contrasts and high spatial frequencies.

The region of interest can also be defined on the basis of the spectrometry image IS to refine a region of the spectrometry image IS which does not have strong contrasts on the initial image II, that is to say a region where the measurement positions PM are not necessarily considered very contributory. The user can for example define the region of interest where he senses strong contrasts on the spectrometry image IS. The region of interest can also be defined automatically. For example, an area of sample 1 which shows variations in spectrometry values on the spectrometry image IS but which does not show any particular intensity variations on the initial image II, can define a region of interest.

New spectrometry measurements can be acquired outside the region of interest, for example once all measurement positions of the region of interest have been acquired or after a determined period of time or once the part of the spectrometry image IS corresponding to the region of interest reaches a determined acceleration factor.

Remarkably, provision can be made to spatially integrate a spectrometry measurement on a sector of sample 1.

The spatial integration of a measurement can be carried out by moving the excitation beam 2 relative to the sample 1 during the measurement acquisition time. The spatial integration of a measurement can also be carried out by widening the transverse dimensions of the excitation beam 2 during the acquisition of the measurement.

This is particularly useful when a spectrometry measurement is used to estimate the spectrometry values of several neighboring remaining measurement positions. Spatially integrating the measurement makes it possible to obtain an average spectrometry value for this neighborhood. Such a mean value may be more representative of sample 1 than a point spectrometry measurement applied to neighboring spectrometry values. The estimated images can make it possible to estimate whether or not a spectrometry measurement is likely to be used for determining spectrometry values of remaining measurement positions PMR.

The invention claimed is:

1. A method of acquiring and forming a spectrometry image (IS) of a sample (1) comprising the following steps:
    e1) acquisition of an initial image (II) of an area of the sample (1), the initial image (II) being composed of pixels, and definition of a maximum set of N, 2≤N, spectrometry measurement positions (PM), each measurement position (PM) comprising at least one coordinate (CX; CY), representative of the measurement position (PM) with respect to the area of the sample (1), and at least one intensity (IR1; IR2; IG1; IG2; IB1; IB2), determined on the basis of at least one pixel of the initial image (II) located in a neighborhood of the measurement position (PM);
    e2) assignment of a classification value to each of the N measurement positions (PM) on the basis of deviations between the measurement positions (PM), a deviation between two measurement positions (PM) being calculated on the basis of an intensity difference (IR1; IR2; IG1; IG2; IB1; IB2) and a coordinate difference (CX; CY);
    e3) determination of a group of P, 1≤P≤N, measurement positions (PM) among the set of N measurement positions (PM) as a function of the classification values assigned in step e2);
    e4) successively, for each measurement position (PM) of the group determined in step e3), positioning of an excitation beam (2) at said measurement position (PM) on the area of the sample (1), acquiring a spectrometry measurement and constructing the spectrometry image (IS) based on the acquired spectrometry measurement (s).

2. The method according to claim 1, wherein the deviation between two measurement positions (PM) is calculated on the basis of a weighted sum of the square of the difference in intensity (IR1; IR2; IG1; IG2; IB1; IB2) between the two measurement positions (PM) and the square of the coordinate difference (CX; CY) between the two measurement positions (PM).

3. The method according to claim 1, wherein in step e2), the assigned classification values are all different from one another.

4. The method according to claim 1, wherein in step e3), the P measurement positions (PM) of the group are determined according to an ascending, respectively descending order of the classification values.

5. The method according to claim 1, wherein in step e2), a list S comprising the measurement positions (PM) whose classification value remains to be assigned and a list U comprising the measurement positions (PM) whose classification value is assigned are initialized, and the following steps e21) and e22) are iterated:
    e21) for each measurement position (PM) of the list S, determination of a total error by iterating steps e211), e212) and e213) of:
    e211) moving of a considered measurement position from the list S to the list U;
    e212) calculation of the total error associated with the considered measurement position on the basis of deviations between measurement positions (PM) of the list S and measurement positions (PM) of the list U;
    e213) moving the considered measurement position from the list U to the list S;
    e22) selecting a measurement position (PM) from the list S on the basis of each total error determined in step e21), assigning a classification value to the selected measurement position and moving the selected measurement position from list S to list U.

6. The method according to claim 5, wherein a classification value is initialized to a predetermined value and at each iteration of step e22), a classification value strictly lower, respectively higher, than the lowest, respectively highest, classification value is assigned to the measurement position (PM) with the lowest total error.

7. The method according to claim 5, wherein in step e212), the determination of the total error associated with the considered measurement position comprises the following steps:
- e2121) for each measurement position (PM) of list U, determination of the measurement position (PM) of list S with which the deviation is minimum, the value of the deviation between these two measurement positions (PM) defining a minimum deviation;
- e2122) calculation of the total error on the basis of each minimum deviation determined in step e2121).

8. The method according to claim 1, wherein the group comprises at least three measurement positions (PM) and wherein a trajectory for carrying out the successive positionings of the excitation beam (2) is predetermined.

9. The method according to claim 1, wherein steps e3) and e4) are iterated and wherein at each new iteration, the group determined in step e3) comprises only measurement positions (PM) for which a spectrometric measurement remains to be acquired.

10. The method according to claim 1, comprising a step e11) of acquiring at least one spectrometry measurement in at least one predetermined measurement position, a predetermined classification value is assigned to each at least one predetermined measurement position.

11. The method according to claim 1, wherein the construction of the spectrometry image (IS) comprises the following steps:
- e41) for each measurement position (PM) for which a spectrometry measurement has been acquired, determining a spectrometry value based on said spectrometry measurement;
- e42) for each remaining measurement position, determining a spectrometry value on the basis of at least one selected spectrometry measurement, which is selected as a function of the coordinate difference between said remaining measurement position and the measurement position (PM) at which said at least one selected spectrometry measurement was acquired.

12. The method according to claim 11, wherein in step e42), the selected spectrometry measurements are the spectrometry measurements acquired at measurement positions (PM) having a difference in coordinates with said remaining measurement position less than a threshold value.

13. The method according to claim 10, wherein, in step e42), the spectrometry value is determined on the basis of each selected spectrometry measurement weighted by the deviation between the measurement position (PM) at which the selected spectrometry measurement was acquired and said remaining measurement position.

14. The method according to claim 1, comprising a step e43) of interpolating the spectrometry image (IS) in which a plurality of interpolation coefficients is determined on the basis of the deviations between the measurement positions (PM).

15. The method according to claim 1, comprising a stopping measure to end, in step e4), the acquisition of additional spectrometry measurements.

16. The method according to claim 1, wherein the number of spectrometry measurements to be acquired is predetermined.

17. The method according to claim 1, wherein a region of interest, comprising only part of the measurement positions (PM), is predetermined in the initial image (II), and in step e3) the group is determined based on the measurement positions (PM) belonging to the region of interest.

18. The method according to claim 1, wherein at least one spectrometric measurement is spatially integrated over a sector of the sample (1).

19. The method according to claim 1, wherein the initial image (II) is acquired according to one of the following imaging methods:
- spectroscopic acquisition at one or more predetermined spectral bands;
- optical acquisition in reflection or in transmission;
- hyperspectral acquisition;
- acquisition by atomic force microscope;
- acquisition by scanning electron microscope.

20. A spectroscopic measuring apparatus comprising:
- a light source designed to generate an excitation beam (2);
- a support adapted to receive a sample (1);
- an image capture device;
- a processor programmed to implement steps e1) to e4) of the method according to claim 1.

* * * * *